United States Patent Office 3,759,826
Patented Sept. 18, 1973

3,759,826
FRACTIONATION BY GEL PERMEATION
Vincent F. Felicetta and Ellis Gray King, Bellingham, Wash., assignors to Georgia-Pacific Corporation, Portland, Oreg.
No Drawing. Filed Aug. 23, 1971, Ser. No. 174,184
Int. Cl. B01d 15/08
U.S. Cl. 210—31 C
13 Claims

ABSTRACT OF THE DISCLOSURE

A process for the fractionation and recovery of water-soluble compounds by gel permeation using a water-insoluble, polymerized lignosulfonate resin.

This invention pertains to a process for the separation and purification of water-soluble compounds by contacting an aqueous solution of the compounds with a polymerized lignosulfonate resin. More particularly, it pertains to fractionation and recovery of high molecular weight, water-soluble natural and synthetic polymers by gel permeation using the polymerized lignosulfonate as a molecular sieve.

Purification or fractionation of a mixture on basis of molecular weights by use of gel permeation or molecular sieve has been limited mainly to laboratory or specialized applications such as pharmaceutical or clinical work. While the technique has wider application, the process has been costly and thus economically unattractive for other than specialty products. There are many effluents or materials obtained from natural product processing such as in pulp and paper and food industries which contain mixtures of water-soluble products of various molecular weights varying from macromolecular weight organic polymers to low molecular weight organic as well as inorganic compounds. Many of these products are by-products in great supply. While these products contain useful constituents, the lack of economical means for upgrading these materials by recovery of the effective constituents or removing the ineffective constituents has greatly limited their utility. For some of the applications, the materials as obtained containing the various constituents may be used. However, in some applications it becomes necessary to fractionate or remove the ineffective constituents. In many applications, these products are used with low value materials which thus limits the extent and cost of processing to which the effluents may be subjected. Thus, it is desirable to have a process for the fractionation and recovery of these materials using inexpensive, readily available gels or resins.

It is, therefor, an object of this invention to provide a process for the fractionation or recovery of water-soluble compounds by gel permeation or molecular sieve action. Another object is to provide a process for the fractionation of the high molecular weight, water-soluble organic compounds in fractions or increments of particular molecular weights. A still further object is to provide a process for the fractionation and recovery of lignin and lignosulfonate from pulping liquors and treated pulping liquors.

The above and other objects are attained according to the invention by fractionating the materials or effluents by contacting an aqueous solution of the compounds with a lignosulfonate resin for a sufficient time to have the lower molecular weight constituents permeate into the lignosulfonate resin. The contacted resin is then eluted with water and fractions of the polymer of particular molecular weights are recovered from the eluting effluent. The lignosulfonate resin contacted by the solution is a resin condensed to insolubility and to an extent such that the calcium salt form of the resin upon being contacted with water will swell to a bed volume of from 3 to 10 milliliters per gram of dry gel. By the above process, the large molecular weight organic constituents may not only be separated from the low molecular weight constituents but may also be fractionated into a series of increments or fractions of varying molecular weight.

While the process will be described with reference to fractionation of pulping liquors, particularly lignosulfonates, it is applicable to fractionation and recovery of any natural or synthetic, water-soluble, high molecular weight polymer which will not combine with the lignosulfonate resin. The lignosulfonate resin is relatively inert to most high molecular weight polymers and effluents containing these polymers and is substantially not affected by acids, dilute alkalis, aliphatic alcohols, ketones, chloroform, and other common organic solvents.

Other lignin liquors, such as those obtained in alkali or kraft pulping process, as well as carbohydrates or polysaccharides or wood sugars as obtained in hydrolysis of lignocellulosic materials such as wood, corn stalks, straw and the like may be fractionated for recovery of the high molecular weight constituents. The process is also applicable to fractionation of soluble tannins and sulfonated tannins, such as obtained by extraction of bark or wood or obtained by sulfonation of a tannin extract or bark including tannin derivatives as disclosed in U.S. Pat. No. 3,537,991. In addition, it may be used for the recovery of soluble proteins and carbohydrates from food processing effluents such as whey and corn processing industries and for recovery or fractionation of other natural polymers such as dextrin, pectins, and anti-biotics and enzymes. However, in the recovery of proteins, the process must be operated at a pH above the isoelectric point of the protein or otherwise the protein will combine with the sulfonate groups of the lignosulfonate resin. In addition to the natural polymers, synthetic polymers such as sulfonated aromatic vinyl polymers as sulfonated polystyrene and other polymers of monoalkylene aromatic sulfonates of the type disclosed in U.S. Pat. No. 3,023,760, for example, may also be fractionated or recovered from various effluents or reaction mixtures. Other synthetic polymers which may likewise be fractionated or recovered are polyvinyl acetate and polyvinyl alcohol polymers used commonly for coatings, adhesives and binders. The above are illustrative examples of some of the natural and synthetic polymers which may be fractionated and recovered from various mixtures or streams. Many of these polymers are found in effluents and other mixtures in molecular weights varying from 200 to 300 to over 200,000.

The lignosulfonate resin used as a molecular sieve can be prepared from sulfonated lignin obtained from any source. Lignin is a polymeric substance of substituted aromatics found in plant and vegetable tissue associated with cellulose and other plant constituents. While there is some variation in the chemical structure and of other constituents found in the plant, depending upon the type of plant, place where the plant is grown, and also upon the method used in recovery or isolation of the particular constituents from the plant tissue, the basic structure and properties of these materials are similar and upon sulfonation form a well-known group of materials referred to as "lignosulfonates" or "sulfonated lignin." The reaction and properties of lignosulfonates and lignin are covered in the text The Chemistry of Lignin by F. E. Brauns et al., Academic Press, New York, N.Y. (1960).

One of the main sources of sulfonated lignin is the residual pulping liquors obtained in the pulp and paper industry where lignocellulosic materials such as wood, straw, corn stalks, bagasse and the like are processed by well-known methods to recover the cellulose or pulp. In the sulfite pulping process, the lignocellulose is digested with a sulfite or bisulfite to sulfonate the lignin and obtain a residual pulping liquor commonly referred to as "spent sulfite liquor" containing the sulfonated lignin. In other processes, the residual pulping liquor or the lignin as obtained from the process may not be a sulfonated product. However, the residual liquors or products containing the lignin portion may be sulfonated by the various known methods to the degree desired by the reaction, for example, with a bisulfite or sulfite, including further sulfonation of the spent sulfite liquor. Residual pulping liquors obtained in the kraft or other alkaline processes in the digestion of lignocellulosic materials, "hydrolysis lignin" obtained by hydrolysis of lignocellulosic materials in manufacture of wood sugars may thus be sulfonated to form lignosulfonate which may be used in preparation of the resin.

In addition to using the lignosulfonates as obtained in the pulping liquors, the lignosulfonate resin may be prepared from particular molecular weight fractions of lignosulfonate or from pulping and other liquors which have been subjected to different treatments, such as for example acid treatment, alkaline or heat treatments, oxidation or fermentation to remove or modify some of the non-lignin constituents or for other purposes. Generally the basic phenyl-propane polymeric structure of the lignin constituents and properties and characteristics of these products are not destroyed unless the treatment is usually severe. For example, a vanillin raffinate obtained by oxidation of a spent sulfite liquor in preparation of vanillin may consist mainly of degradation products but may still contain sufficient amounts of low molecular weight oxidized lignosulfonates which may be condensed to the degree desired under more severe condensation conditions. Lignosulfonates or the lignosulfonate-containing liquors can be oxidized to a lesser extent than in preparation of vanillin, by enzymatic oxidation as disclosed in U.S. Pat. No. 3,212,966, by electrolysis or by chemical oxidation using oxidizing agents such as halogens, chlorine dioxide, oxygen, ozone, peroxide, hypochlorites, metal oxides such as chromium trioxide and other oxidizing agents as nitric acid and dichromates. Further, the treated and non-treated products can also be fractionated by use of the resin prepared from these products.

The lignosulfonate may be polymerized by condensing the lignosulfonate under acid conditions or reacting the lignosulfonate with an aldehyde cross-linking agent under known methods to obtain the insoluble resin. Lignosulfonate solutions are used such that upon polymerization gelation of the solution is obtained. Since lignosulfonates will polymerize under acid conditions without the presence of a cross-linking agent, a lignosulfonate solution of sufficient concentration may be simply acidified to a pH, preferably below 1, and maintained under the acid conditions until the product has polymerized to the desired extent. While the lignosulfonate resin used for gel permeation is insoluble in water, it will swell upon contact with water. The degree of swelling or increase in volume obtained upon contact with water is an indication of the degree of polymerization obtained and the dimensional stability of the resin. Resins which will swell under atmospheric conditions in water to a bed volume of from 3 to 10 milliliters per gram of resin dried at 105° C. are operative, with resins swelling or increasing in volume to from 3.5 to 7.5 milliliters per gram being preferred.

The extent of swelling obtained with the lignosulfonate resin when contacted with water will depend upon the salt form of the resin at the time of contact. While the lignosulfonate resin is condensed to insolubility, the resin still contains sulfonate groups or other ionic groups and thus is converted to a salt of the same metal base with which it is contacted. The expansion or swelling factors as specified herein, unless otherwise stated, refer to the lignosulfonate resin being in a calcium form prior to contact with water. The swelling of the gel is decreased by presence of an electrolyte. Thus, the gel will swell less in presence of a salt solution than in water. These variations in swelling are more pronounced for the more loosely cross-linked resins. For example, a resin having a swelling factor of 3 in water will relatively swell the same amount in a 2 percent calcium chloride solution, while a resin having a swelling factor of 7 in water will swell about 15 percent or so less in the 2 percent calcium chloride solution.

In polymerizing the lignosulfonate under acid conditions, a solution, for example, a spent sulfite liquor containing from about 30 to 60 weight percent solids, is acidified and maintained at room or elevated temperature until the desired degree of polymerization is obtained which may be determined to a certain extent by the firmness of the gel obtained. If the desired extent of polymerization has been obtained, the gel is broken up, neutralized, washed with water and ground to the desired particle size after drying. However, if additional polymerization is desired, this can be obtained by drying the gel under acid conditions without neutralization.

The acid polymerization of lignosulfonate may also be carried out by acidifying the lignosulfonate solution as a dilute or concentrated solution and evaporating the acidified solution to dryness at a temperature in the range of 80° to 110° C. The product obtained can then be neutralized, washed with water to remove the soluble constituents and then ground after drying to a particle size desirable for the particular application to be made of the resin.

In the acidification of lignosulfonate solutions, generally inorganic acids such as hydrochloric, sulfuric, and phosphoric are used, with sulfuric acid being preferred. However, other acidifying agents may be used, for example, the product may be contacted with a strongly acidic ion exchange resin to convert the lignosulfonate to the acid form. While it is not necessary to heat the acidified lignosulfonate solution to obtain polymerization, the rate of polymerization increases rapidly with an increase in temperature. Whereas a solution of lignosulfonate which has been acidified with the base exchange amount of acid will not gel at room temperature, it will gel in 15 to 30 hours at temperatures of 80° to 105° C., and in an hour or less at temperatures of 160° C. or so. The acidified solutions are preferably heated to a temperature in the range of 80° to 105° C. The desired extent of polymerization of the lignosulfonate is generally obtained at substantial completion of the polymerization reaction at the latter temperatures. Very little further changes in properties or increase in molecular weight are obtained upon further heating of the resin under these conditions. While temperatures to decomposition temperature of the lignosulfonate may be used, the extent of polymerization may have to be controlled to obtain the desired product. Also, in using high temperatures, a rapid reduction in pressure during the polymerization must be avoided to keep from rupturing the cellular or pore structure of the gel.

In addition to the preparation of the resin by polymerization under acid conditions, the lignosulfonate may likewise be cross-linked by using a cross-linking agent such as formaldehyde, acetaldehyde, and heterocyclic aldehydes such as furfural and hydroxymethyl furfural. Formaldehyde is preferred. The reaction may be carried out under acid or alkaline conditions. Generally a resin which is prepared under alkaline conditions will have improved stability under harsher alkaline conditions over the resin which has been prepared with an acid catalyst. On the other hand, an acid polymerized resin would be more desirable from the stability point of view for use in recovery and fractionation or recovery of the polymers from strongly acidic solution. Also, the acid-catalyzed resin is more firm and has a lower degree of swelling for the same pore size than a product obtained polymerized under acid conditions only. The extent of inter-action or cross-linking obtained of lignosulfonate with formaldehyde is such that the resin obtained will have the necessary degree of polymerization when the reaction between formaldehyde and the lignosulfonate is carried out substantially to completion under atmospheric pressure at a temperature of 95° C. or so. Generally less than 10 percent of formaldehyde will react with the lignosulfonate under these conditions, even though larger amounts may be added. Lignosulfonate solutions of from 25 to 45 percent are generally employed in reaction with from 5 to 10 weight percent of formaldehyde at temperatures of from 50° to 95° C. The extent of cross-linking obtained increases with the more dilute solutions and in carrying out the reaction at higher temperatures. Temperatures in the range of from 110° to 130° C. may be conveniently employed for acetaldehyde and the heterocyclic aldehydes used in molar amounts equivalent to that of formaldehyde.

In effecting the fractionation or separation using the lignosulfonate resin, the normal procedures of batch or column operation used in liquid-solid mass transfer operations may be employed for contacting the solution being fractionated with the lignosulfonate resin. The particle size of the resin used, the dimension or size of equipment employed, and conditions of operation are a matter of engineering choice depending upon the polymer being fractionated and the separation desired. The extent of cross-linking of the lignosulfonate resin employed determines the point at which separations are made. The resins are generally prepared such that they will have a pore size predominantly in a particular range for the most efficient fractionation in a certain molecular weight range. A resin which has been cross-linked to a greater degree and thus has a smaller swelling ratio will generally have a smaller pore size so that this resin will exclude lower molecular weight material than a gel having a larger swelling ratio or cross-linked to a lesser extent. For example, a resin which has a swelling ratio of about 4 as defined earlier may have a pore size such that lignosulfonates having a diffusion coefficient of about 9 mm.$^2$/day or a weight average molecular weight of about 20,000 and greater would not permeate into the resin. However, a resin which has a swelling ratio of about 6 or 7 may only exclude lignosulfonates having a diffusion coefficient of about 6 mm.$^2$/day or a molecular weight of about 50,000 and greater. Thus, generally when a product being fractionated is a low molecular weight material, a more highly cross-linked resin is used. For example, a more highly cross-linked resin would be used for sugars such as corn syrups or a hydrolyzate which is obtained from hydrolysis of wood than in the fractionation of lignosulfonates or tannins since the sugar compounds are usually of lower molecular weight. However, the particular resin selected may also depend upon the separation or fractionation desired. Often, effluents or mixtures containing the polymers are fractionated to recover or remove particular groups rather than to obtain the polymers in a series or small fractions of narrow molecular weight range. If a group separation is desired such as to obtain the high molecular weight lignosulfonates above 20,000 molecular weight, a resin having a swelling ratio of about 4 as noted above, could be used. Since the lignosulfonates having molecular weights of 20,000 and above do not permeate into the resin, the lignosulfonates having a molecular weight of 20,000 and above would be eluted as a group without substantial fractionation or separation. The lignosulfonates which permeated into the resin would be eluted on basis of the molecular weights so that a series of fractions of lignosulfonates of relatively narrow molecular weight range would be obtained. With the resin having a swelling ratio of 7, the high molecular weight lignosulfonates could be obtained in several fractions of different molecular weight. In a desalting operation where an inorganic salt is removed from the organic constituents, a more highly cross-linked or a tighter resin as one having a swelling ratio of 3 would be advantageous in that most of the organic constituents could then be excluded. If it is desirable to obtain fractions of the lignosulfonates in small molecular weight ranges over a wide range such as for molecular weights of from 200 to about 20,000, a mixture of the lignosulfonates having different degrees of cross-linking may be used or fractions obtained with one resin further fractionated using a resin of different pore size to obtain the desired separation or fractionation.

It is apparent that the shape of the molecule of the polymer being fractionated or recovered will have some effect upon actual molecular weight of the fractions obtained with a particular resin. Since the separation is effected on basis of the hydrodynamic volume of the molecule, a compact molecule is smaller in size and thus fractions obtained with this polymer would have higher molecular weight than the corresponding fractions for a more loosely bound polymer. The particular fractionation and molecular weights that can be obtained with a lignosulfonate resin cross-linked to a particular degree can be easily determined definitely by testing a small simple of the specific effluent or mixture of the polymers under the various conditions to be used and determining the molecular weight of the fractions obtained.

A column packed to a height of from 2 to 8 feet with a resin having a particle size in the range of from 30 to 200 mesh is often used. Distribution plates may be employed to minimize channeling. The aqueous solutions being fractionated are generally passed through the bed at a rate of 0.8 to 3 cubic feet per square foot of cross-sectional area of the bed per hour. A cyclic operation is employed wherein an amount of the aqueous solution is passed through the bed after which the bed is eluted with a given amount of water and again followed by the addition of more of the fractionating solution. Generally the volume of the solution charged through the bed prior to elution with water is from about 10 to 20 percent of the bed volume. After this contact, the amount of water used for elution of the bed is from 2 to 4 times the volume of the fractionating solution used so that an elution factor of from 3 to 5 is obtained. However, the amount of solution charged through the bed and the amount of water used for elution can be considerably varied depending upon the degree of fractionation desired. If it is only desirable to remove the high molecular weight constituents, the column can be operated at higher flow rates and at a greater throughput so that the volume of the solution passing through the bed may approach 30 to 50 percent of the volume of the bed prior to elution. However, by operating at lower contact volumes prior to elution and at lower flow rates, the high molecular weight constituents are not only separated from the lower molecular weight constituents but further fractionation or separation of the constituents in different increments of varying molecular weights is obtained.

The solutions fractionated are generally of a concentration in a range of from 10 to 35 weight percent and may be passed through the column at room temperature or preheated to temperatures of around 60° C. At higher temperatures, the viscosity of the solution decreases which enhances the fractionation or separation effected by the gel permeation. With higher concentrated solutions, the temperature may be increased to obtain a lower viscosity.

The fractionation of the solution can be carried out at various pH's. While the lignin resin is substantially stable to both acid and alkaline conditions, for highly alkaline solutions such as kraft liquor which may be at a pH of 10 to 12, a lignosulfonate resin which has been cross-linked under alkaline conditions would be preferably used. Also, it may be desirable at times to elute the resin in the presence of a small amount of alkali instead of plain water. For example, in fractionation of kraft liquor, or of an alkaline treated lignosulfonate, precipitation of lignin may be obtained in the column upon elution with water which would result in lowering the pH. Thus, in these situations, sodium carbonate or another electrolyte may be added to control the pH.

Also, it may be desirable at times to elute the column in presence of a small amount of electrolyte having the same base as that of the solution being fractionated. For example, if a hydrolyzate from hydrochloric acid hydrolysis of wood is being fractionated, the resin would be converted to the acid form and the elution would be preferably preformed with an acid solution, such as for example, 1 percent hydrochloric acid. This minimizes the expansion and contraction of the resin. The contraction obtained in presence of electrolyte is the greatest for acids and decreases for salt solutions with relatively small change being effected by alkaline earth and the heavier metal salt solutions. Generally, the variations in the swelling are not sufficient to require the presence of electrolytes and the elution can be effected with water. However, it may be desirable to use an electrolyte for acid solutions, especially when the less tightly cross-linked resins are used which are affected to a greater extent by the electrolyte.

EXAMPLE I

A fermented and an unfermented spent sulfite liquor were fractionated using an acid polymerized lignosulfonate resin. The resin used for the fractionation was condensed by adding 12 weight percent sulfuric acid to a spent sulfite liquor which had been concentrated to 25 percent solids. The 12 percent sulfuric acid, based upon the spent sulfite liquor solids, was a stoichiometric amount to react with the calcium present in the spent sulfite liquor. The de-ashed liquor was centrifuged to remove the calcium sulfate. The calcium sulfate-free solution was then placed in a tray and tray-dried at 105° C. for 16 hours. The condensed dry product obtained was ground, washed with water and neutralized with a lime slurry and redried. After drying, the neutralized resin was ground and screened to obtain particles in the range of 30 to 150 mesh which were swelled in water and packed in a 1½-inch diameter column to a height of about 35 inches. The resin had a swelling ratio such that upon contact with water it gave a bed volume of 3.7 milliliters per gram of resin dried at 105° C.

The hydrated bed of resin was used for the fractionation and recovery of the lignosulfonates from spent sulfite liquors which were concentrated to 25 weight percent and passed through the column in feed volumes of 150 milliliters, representing about 15 volume percent of the bed, prior to elution with water. The molecular weight and lignosulfonate content of the feed and fractions obtained were determined.

The molecular weights were determined by the agar gel diffusion method as described by J. Moacanin, H. Nelson, E. Back, V. F. Felicetta, and J. L. McCarthy in J. Am. Chem. Soc., 81, 2054 (1959). The lignosulfonate content was calculated from ultraviolet absorption data obtained by use of a spectrophotometer at a wave length of 232.5 m$\mu$. A sample of the solution to be analyzed was diluted appropriately and the absorbance of the solution with respect to water at a wave length of 232.5 m$\mu$ was determined. The concentration of the lignosulfonate in the solution was calculated on the basis of absorbance multiplied by the dilution factor and divided by an empirical constant determined on the basis of a purified lignosulfonate solution of known concentration. From these values the percent of lignosulfonates was calculated based upon the solids content of the particular fraction.

The lignosulfonate fractions recovered indicated that the resin excluded the lignosulfonates having a diffusion coefficient of about 9 mm.$^2$/day which represents a weight average molecular weight of about 20,000.

The details and the results are shown in the table below.

FERMENTED SPENT SULFITE LIQUOR

Feed:
Feed volume, percent of bed volume_____ 15
Diffusion coefficient of feed, mm.$^2$/day_____ 11.6
Lignosulfonate, percent of total solids_____ 72

| Fractions | Solids content, percent of total solids | Diffusion coefficient, mm.$^2$/day | Molecular weight | Lignosulfonate, percent of total solids in fraction |
|---|---|---|---|---|
| 1 | 17.0 | 9.0 | 20,000 | 97 |
| 2 | 24.5 | 9.4 | 18,000 | 95 |
| 3 | 20.8 | 11.7 | 11,000 | 79 |
| 4 | 26.6 | 18.2 | 3,800 | 36 |

UNFERMENTED SPENT SULFITE LIQUOR

Feed:
Feed volume, percent of bed volume_____ 15
Diffusion coefficient of feed, mm.$^2$/day_____ 11.5
Lignosulfonate, percent of total solids_____ 58
Sugar, percent of total solids_____ 25.0

| Fractions | Solids content, percent of total solids | Diffusion coefficient, mm.$^2$/day | Molecular weight | Lignosulfonate, percent of total solids in fraction | Sugar, percent of total solids in fraction |
|---|---|---|---|---|---|
| 1 | 7.1 | 8.9 | 21,000 | 100 | |
| 2 | 12.0 | 9.0 | 20,000 | 100 | |
| 3 | 12.0 | 9.2 | 19,000 | 100 | |
| 4 | 10.4 | 11.3 | 12,000 | 89 | 1.0 |
| 5 | 5.4 | | | 64 | 20.3 |
| 6 | 5.9 | | | 54 | |
| 7 | 6.1 | | | 44 | 38.5 |
| 8 | 5.7 | | | 37 | |
| 9 | 5.4 | | | 28 | 55.7 |
| 10 | 5.0 | | | 21 | |
| 11 | 4.9 | | | 17 | 70.1 |
| 12 | 6.2 | | | 18 | |
| 13 | 3.3 | | | 25 | 43.6 |
| 14 | 1.5 | | | 29 | |

EXAMPLE II

A fermented calcium-base spent sulfite liquor was fractionated using a sulfite lignin resin prepared by bulk polymerization of lignosulfonate in a concentrated aqueous solution.

In preparation of the resin, sulfuric acid was added to a 49 weight percent fermented spent sulfite liquor and the mixture, after centrifugation for removal of calcium sulfate, was maintained at 95° C. for 33 hours. The resulting gel obtained was then broken up by use of a Waring blender, neutralized with lime, washed with water and dried at 65° C. After drying the product was ground and screened to a 30 to 150 mesh. In preparation of the resin, 15 weight percent of acid, based upon the spent sulfite liquor solids, was added. This amount of acid was in excess of the stoichiometric amount of acid necessary for the replacement of calcium which was 12 weight percent. The resin condensed with 15 percent acid had a swelling ratio of about 6.0, when expressed on the basis of the hydrated volume in milliliters of one gram of dry resin. A resin made with a stoichiometric amount of acid under the same conditions had a swelling ratio of 7.2.

The resin made with 15 percent acid was used for fractionation of a fermented calcium-base spent sulfite liquor. The column used was 1.75 centimeters in diameter and was packed such that the hydrated gel in the calcium form gave a bed 40 inches in height. The fermented spent sulfite liquor being fractionated was at a concentration of 18 percent total solids and was passed through the column at a flow rate of 1.5 milliliters per minute. The feed volume used was 25 milliliters which represented about 10 percent of the volume of the bed.

The details and results obtained of the fractions are shown in the table below.

| Fractions | Solids content, percent of total solids | Diffusion coefficient, mm.²/day | Molecular weight of lignosulfonates | Lignosulfonates, percent of total solids |
|---|---|---|---|---|
| 1 | 0.9 | | | |
| 2 | 4.3 | 6.2 | 51,000 | 100 |
| 3 | 7.9 | | | 100 |
| 4 | 8.9 | 6.3 | 49,000 | 100 |
| 5 | 8.0 | | | 95 |
| 6 | 10.3 | 10.7 | 14,000 | 79 |
| 7 | 11.6 | | | 53 |
| 8 | 13.9 | 17.5 | 4,100 | 41 |
| 9 | 17.3 | | | |

EXAMPLE III

A lignosulfonate resin was prepared by cross-linking the lignosulfonate with formaldehyde under alkaline conditions. A 49 percent solution of a fermented calcium-base spent sulfite liquor, converted to a sodium base by treatment with sodium sulfate, was heated for 16 hours at 90° C. at a pH of about 10. After the alkaline treatment, the solution was diluted to 40 weight percent solids and formaldehyde was added in an amount of about 10 percent of the lignosulfonate solids. The formaldehyde treated liquor was heated for 3 hours at 85° C. after which an additional amount of sodium hydroxide in an amount of about one percent was added. The product was gelled by heating for 16 hours at 95° C. The gel was broken up, washed with water to remove the water-soluble constituents and then tray-dried. After drying, the polymerized lignosulfonate was ground and screened.

The above resin, screened to 30 to 150 mesh, was packed into a column of 1.75 centimeters in diameter to a height of 40 inches after hydration and conversion to a calcium-base resin. The resin which was converted to the calcium base batchwise in a beaker with a solution of calcium chloride had an expansion or swelling ratio of 6.7 milliliters per gram of dry resin. The fermented spent sulfite liquor fractionated was at a concentration of 18 percent solids and was passed through the column at a flow rate of 1.5 milliliters per minute in a feed volume or increment of 25 milliliters prior to elution which represented about 10 percent of the bed volume. The details and fractions obtained are shown in the table below.

Feed:
   Diffusion coefficient, mm.²/day _____ 12.7
   Lignosulfonate, percent of total solids _____ 70

| Fractions | Solids content, percent of total solids | Diffusion coefficient, mm.²/day | Molecular weight | Lignosulfonate, percent of total solids |
|---|---|---|---|---|
| 1 | 4.2 | | | 100 |
| 2 | 10.0 | 5.8 | 60,000 | 100 |
| 3 | 14.4 | | | 100 |
| 4 | 14.0 | 7.8 | 29,000 | 97 |
| 5 | 7.0 | | | 84 |
| 6 | 8.0 | 18.3 | 3,700 | 58 |
| 7 | 10.9 | | | |
| 8 | 12.6 | 23.9 | 1,700 | 25 |
| 9 | 16.5 | | | |

EXAMPLE IV

A fermented calcium-base spent sulfite liquor was reacted with formaldehyde under acid conditions to polymerize or cross-link the lignosulfonate to obtain a gel permeation resin. The spent sulfite liquor, at a 40 percent solids concentration, was alkaline, treated by being heated at 90° C. for 16 hours after adjusting the liquor to pH 9.1 with caustic. After the alkaline treatment, the lignosulfonate solution was acidified with 12 percent sulfuric acid, based upon the solids content of the alkaline treated product, and centrifuged to remove the calcium sulfate. The amount of acid used was sufficient to neutralize the alkali used and precipitate, as calcium sulfate, about half of the calcium present in the liquor. Formaldehyde in an amount of 10 percent, based upon the solids content, was added and the mixture placed in a hot water bath at 85° C. The lignosulfonate solution partly gelled in 4 hours and the polymerization was completed by heating the mixture to 95° C. for about one hour. The gel obtained was broken up, neutralized with lime, washed with water, and tray-dried at 105° C. The resin prepared had a swelling ratio of about 4.8 milliliters per gram of dry resin.

Resins were also prepared using acetaldehyde and furfural. The spent sulfite liquor was not alkaline treated, but the reactions were carried out under acid conditions with sufficient acid to precipitate about half of the stoichiometric amount of calcium present in the liquor. The molar ratios of acetaldehyde and furfural to lignosulfonate used were the same as that used for formaldehyde above. The spent sulfite liquor containing the acetaldehyde was heated for about 17 hours at 95° and then for 6 hours at 125° C. The liquor with the furfural was only heated at 95° C. for 20 hours. The resins prepared with acetaldehyde and furfural had swelling ratios of about 6.8 and 4.8 milliliters per gram of dry resin, respectively.

The resin obtained using formaldehyde, screened to 30 to 150 mesh, was packed into a column of 1.75 centimeters to a height of 40 inches after hydration and was used for the fractionation of a fermented calcium-base liquor similar to that described in Example III. The lignosulfonate solution at a concentration of 18 percent solids was passed through the column at a flow rate of between 1.5 to 2 milliliters per minute in a feed volume or increment of 25 milliliters prior to elution which represented about 10 percent of the bed volume. The details and the fractions obtained are shown in the table below.

Feed:
   Diffusion coefficient, mm.²/day _____ 12.6
   Lignosulfonate, percent of total solids _____ 69

| Fractions | Solids content, percent of total solids | Diffusion coefficient, mm.²/day | Molecular weight | Lignosulfonate, percent of total solids |
|---|---|---|---|---|
| 1 | 6.7 | | | 97 |
| 2 | 9.4 | 5.4 | 70,000 | 98 |
| 3 | 14.6 | | | 100 |
| 4 | 10.9 | 7.7 | 30,000 | 97 |
| 5 | 5.9 | | | 77 |
| 6 | 6.1 | 16.9 | 4,500 | 55 |
| 7 | 7.4 | | | |
| 8 | 15.0 | | | 39 |
| 9 | 17.8 | | | |

EXAMPLE V

Skimmed milk was fractionated to separate the proteins from the sugars in the milk using the resin of Example I. The resin was prepared by polymerization of a fermented calcium-base spent sulfite liquor by the addition of 12 percent sulfuric acid to de-ash the liquor and then evaporating the water in a tray drier at 105° C. for 16 hours to dryness. After processing the resin as described in Example I, the resin was packed to a height of about 42 inches in a column having an internal diameter of 2.8 centimeters.

Fortified skimmed milk containing 110 grams per liter of solids was passed through the column at a rate of 5 milliliters per minute in an amount of 50 milliliters which represented about 7.5 percent volume of the bed. The solids comprised 36.4 percent reducing sugars as glucose and about 38.1 percent of protein. The milk was at a pH of 6.65. The column was eluted with about 340 milliliters of water to which was added 0.1 gram per liter of calcium hydroxide. The fractions obtained which had a pH in the range of 7.2 to 7.8 are shown in the table below.

| | |
|---|---|
| Concentration of milk solids, grams/liter | 110 |
| Concentration of protein in solids, weight percent | 38.1 |
| Concentration of reducing sugars, weight percent | 36.4 |

| Fraction | Percent of total milk solids | Reducing sugars, percent of total solids | Protein, percent of total solids |
|---|---|---|---|
| 1 | 5.0 | 1.7 | 66 |
| 2 | 11.9 | 1.4 | 82 |
| 3 | 11.9 | 1.4 | 62 |
| 4 | 11.4 | 29 | 32 |
| 5 | 13.1 | 53 | 7.0 |
| 6 | 24.1 | 60 | 2.4 |
| 7 | 15.3 | 58 | |
| 8 | 4.2 | 47 | |
| 9 | 1.4 | 40 | |
| 10 | 0.9 | 32 | |
| 11 | 0.7 | | |

EXAMPLE VI

The column packed with lignosulfonate resin condensed with formaldehyde under acid conditions, in Example IV above, was used for the fractionation of whey to separate the protein from the sugars. The whey used was an 18 percent concentration reconstituted solution made from spray-dried whey solids. The solids contained about 12.5 weight percent protein and about 5.9 percent ash or inorganic constituents. The protein content was determined from the nitrogen analysis on the basis that the protein contained 16 percent nitrogen. The solution was passed through the column at a flow rate of 2 milliliters per minute in a feed volume or increment of 25 milliliters prior to elution which represented about 10 percent of the bed volume. The pH of the whey solution was adjusted to about 8.7 to maintain the pH above the isoelectric point for protein. Thirty-five percent of the protein was recovered in a fraction containing about 35 percent protein.

What is claimed is:

1. A process for the fractionation of an aqueous solution of an organic polymer of a molecular weight in the range of 200 to 200,000 containing water-soluble compounds of different molecular weights, which comprises contacting the aqueous solution with a water-insoluble, polymerized lignosulfonate resin for a sufficient time to have a substantial portion of the lower molecular weight compounds in the solution permeate into the lignosulfonate resin, removing the contacted solution from the resin and eluting the contacted resin to recover the compounds from the resin in increments of different molecular weight, said lignosulfonate resin being an acid polymerized lignosulfonate or a lignosulfonate condensed with an aldehyde selected from the group consisting of formaldehyde, acetaldehyde, furfural, and hydroxymethyl furfural, and said resin being polymerized to the extent that in the calcium salt form, the resin will swell upon being contacted with water to a volume of from 3 to 10 milliliters per gram of dry resin.

2. A process according to claim 1 wherein the aqueous solution is an aqueous solution of a mixture of organic polymers of different molecular weights in the range of 200 to 200,000.

3. A process according to claim 2 wherein the aqueous solution is a lignosulfonate solution of a mixture of lignosulfonates of different molecular weights.

4. A process according to claim 1 wherein the water-insoluble, polymerized lignosulfonate resin is an acid polymerized lignosulfonate resin.

5. A process according to claim 4 wherein the acid polymerized lignosulfonate resin is prepared by adding from 12 to 15 weight percent of sulfuric acid to a spent sulfite liquor containing from 30 to 60 weight percent solids and heating the acidified liquor at a temperature in the range of 80° to 105° C. for from 15 to 30 hours.

6. A process according to claim 4 wherein the acid polymerized lignosulfonate resin is prepared by adding from 12 to 15 weight percent of sulfuric acid to a spent sulfite liquor and heating the acidified liquor at a temperature in the range of 80° to 110° C. to evaporate the water from the solution.

7. A process according to claim 5 wherein the aqueous solution contacted with the resin is a lignosulfonate solution of lignosulfonates of different molecular weights.

8. A process according to claim 6 wherein the aqueous solution contacted with the resin is a lignosulfonate solution of lignosulfonates of different molecular weights.

9. A process according to claim 1 wherein the water-insoluble, polymerized lignosulfonate resin is a lignosulfonate resin cross-linked with formaldehyde.

10. A process according to claim 9 wherein the resin is prepared by adding from 5 to 10 percent of formaldehyde to a lignosulfonate solution containing from 25 to 45 percent solids and heating the formaldehyde treated solution to a temperature of from 50° to 95° C. until the lignosulfonate is substantially completely reacted with the formaldehyde.

11. A process according to claim 9 wherein the aqueous solution contacted with the resin is a lignosulfonate solution of lignosulfonates of different molecular weights.

12. A process according to claim 10 wherein the aqueous solution contacted with the resin is a lignosulfonate solution of lignosulfonates of different molecular weights.

13. A process according to claim 12 wherein the aqueous lignosulfonate solution is a spent sulfite liquor.

References Cited
UNITED STATES PATENTS 3,002,823   10/1961   Flodin et al. _____ 210—31 C LEWIS GOTTS, Primary Examiner A. R. PHILLIPS, Assistant Examiner U.S. Cl. X.R.

260—124 R, 209 D, 209, S, 112 R; 137—13